United States Patent [19]

Hanrot et al.

[11] Patent Number: 4,747,732
[45] Date of Patent: May 31, 1988

[54] CLOSED APPARATUS WITH POTENTIAL FLUIDIZATION FOR HORIZONTALLY CONVEYING POWDER MATERIAL IN A DENSE BED

[75] Inventors: Jean-Pascal Hanrot, Aix En Provence; Jacky Volpeliere, Gardanne, both of France

[73] Assignee: Pechiney, France

[21] Appl. No.: 59,159

[22] Filed: Jun. 3, 1987

Related U.S. Application Data

[63] Continuation of Ser. No. 816,123, filed as PCT FR84/00112, Apr. 20, 1984, published as WO85/04676, Oct. 24, 1985, abandoned.

[30] Foreign Application Priority Data

Apr. 12, 1984 [FR] France ................... 84 06017

[51] Int. Cl.$^4$ .................................. B65G 53/22
[52] U.S. Cl. .................... 406/89; 406/156; 204/67; 204/245
[58] Field of Search ............ 406/89, 155, 156; 204/67, 245

[56] References Cited

U.S. PATENT DOCUMENTS

| | | | |
|---|---|---|---|
| 3,870,374 | 3/1975 | Wentzel, Jr. et al. | 406/89 |
| 4,016,053 | 4/1977 | Stankovich et al. | 406/89 X |
| 4,450,053 | 5/1984 | Merz et al. | 204/67 |
| 4,519,810 | 5/1985 | Haas | 406/89 X |
| 4,659,263 | 4/1987 | Hanrot et al. | 406/89 |
| 4,692,068 | 9/1987 | Hanrot et al. | 406/155 X |

Primary Examiner—Joseph F. Peters, Jr.
Assistant Examiner—James M. Kannofsky

[57] ABSTRACT

A closed apparatus of potential fluidization type, for conveying powder materials in a dense bed from a storage region (31) to at least one region to be fed therewith, comprising a storage tank (48) for storing the powder material, referred to as a reserve container, which comprises between the two regions at least one horizontal conveyor (33) formed by a lower duct (35) for a flow of gas, an upper duct (36) for a flow of the powder material and the gas, between which ducts is disposed a porous wall (34), and at least one conduit (38) for feeding gas to the lower duct, which makes it possible to establish a pressure Pf that creates a dense potential-fluidization bed of the powder material that fills the conveyor, by virtue of the presence of at least one balancing column (39), the filling height (56) of which balances the pressure Pf of the potential-fluidization gas, the improvement wherein the closed storage tank or reserve container (48) of the region to be supplied with material, being provided with an inlet for introducing (47) and an outlet for removing (51) the powder material, is also provided with at least one opening (52) disposed above the limit level of filling with powder material, which opening establishes an equilibrium in respect of pressures between the inside and the outside of said reserve container.

4 Claims, 1 Drawing Sheet

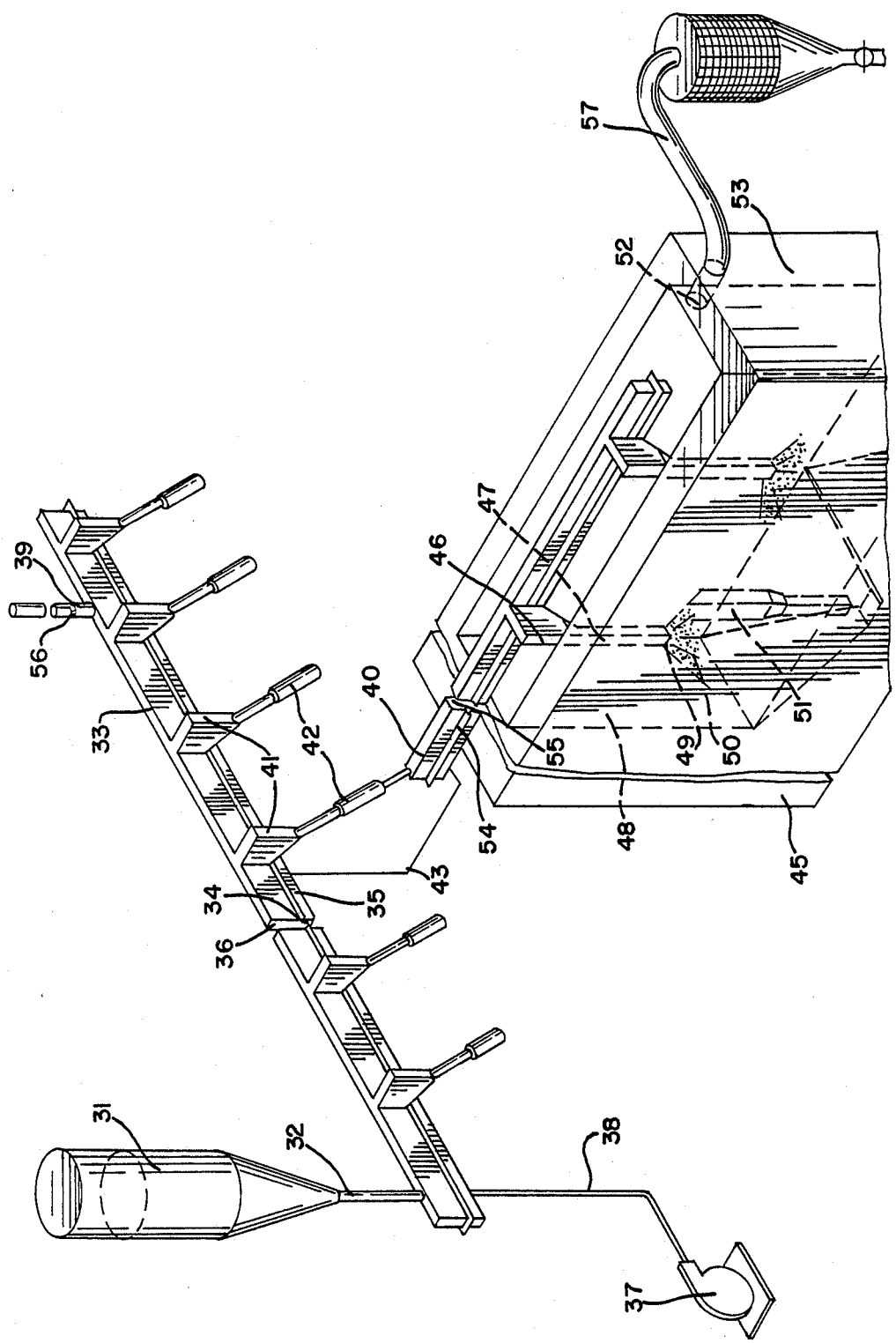

CLOSED APPARATUS WITH POTENTIAL FLUIDIZATION FOR HORIZONTALLY CONVEYING POWDER MATERIAL IN A DENSE BED

This application is a continuation of application Ser. No. 816,123 filed as PCT FR 84/00112 on Apr. 20, 1984, published as WO85/04676 on Oct. 24, 1985, now The present invention which relates to an improvement to the device described in U.S. patent application Ser. No. 821,205 concerns an arrangement of closed potential-fluidization apparatuses for conveying materials which have the characteristics of fluidisable powder materials in a generally horizontal dense bed from a storage region to at least one region to be fed, said regions being spaced from each other, in the particular case where the region to be fed is a closed container referred to as a "reserve container", provided only with an inlet and an outlet for powder materials.

The invention more particularly concerns the arrangement of a closed apparatus for transporting alumina comprising generally horizontal conveyors which are disposed between an overhead storage tank of large capacity and closed vessels or receptacles which are referred to as a "reserve container", each provided with an inlet and an outlet for the alumina and each feeding at least a part of an igneous electrolysis tank for electrolysis of the alumina.

The expression fluidisable materials is used to define all materials which are well known to the man skilled in the art and which occur in a powder form and with a granulometry and cohesion such that the speed of flow of the air which is blown thereinto causes, at a low speed, decohesion of the particles from each other and a reduction in the internal frictional forces. Such materials are for example alumina which is intended for igneous electrolysis, cements, plasters, quick lime or slaked lime, fly ash, calcium fluoride, a filler additive for rubber, faecula, carbon dusts, catalysts, sodium sulphate, phosphates, polyphosphates, pyrophosphates, plastics materials in powder form, foodstuffs such as powdered milk, flours, etc.

It is well known that various technologies have been studied and developed, for example air-cushion conveying assemblies, for transporting powder materials in a fluidized bed and not in a dense bed. One example amongst many is that which involves the supply of alumina to igneous electrolysis cells for the production of aluminium.

For that purpose, the alumina, being a powder product which is transported into and solubilized in the electrolytic bath, is progressively consumed as the electrolysis process takes place and must be replaced as it is consumed in such a way that the level of concentration of solubilized alumina is held within favourable limits with regard to operation of the cell at fully efficiency. Hence, it becomes necessary to regulate the amount of alumina which is introduced into the electrolysis tank in such a manner that the operation thereof is not impaired by an excess or a deficiency of alumina.

Many apparatuses have been proposed by the man skilled in the art and described in the specialist literature, which are intended to permit a regular feed of alumina to an electrolysis tank. A first apparatus as described in French Pat. No. FR-A-20 99 434 provides for a feed of alumina to an electrolysis cell and comprises a tank for storing the alumina, below which there is a measuring device for controlling the amount of alumina which issues from the tank and, finally, a means for the fluidized transportation of the alumina, which is also known as an air-cushion conveyor means, being disposed between the measuring device and the cell to be supplied with alumina, with the alumina tank and the measuring device being disposed laterally beside the cell. The conveyor means is itself provided with outlet pipes for feeding the cell at a plurality of locations by way of dipper or plunger pipes which are displaced with an upward and downward movement, each such pipe supplying substantially the same amount of alumina.

However, such an arrangement suffers from major disadvantages in regard to industrial utilization thereof. In fact, such an apparatus is so designed that it can feed only a single electrolysis tank whereas there is a need to feed a series of electrolysis tanks comprising for example 60 units. In addition, that apparatus is provided with an alumina reservoir that is disposed at a distance from the single tank that it can feed and thus gives rise to a substantial response time between the demand for powder materials and the feed of such material to the electrolysis tank. In addition, that apparatus is provided with a plurality of locations at which powder material is introduced into the electrolysis tank, which do not ensure that the amount of powder material introduced at each location is equal.

Besides the above-mentioned disadvantages, as the measuring device is disposed upstream of the air-cushion conveyor, the powder to be transported is totally fluidized and in that case a layer of gas is generated between the upper surface of the moving fluidized bed and the roof of the air-cushion conveyor, the layer of gas flowing at high speed and entraining therewith the finest particles of the powder being transported. In addition, as the air-cushion conveyor does not have any means for discharge of the gaseous phase, the whole of the fluidization air is introduced into the electrolysis tank at the same time as the alumina, thus increasing the amounts of very fine particles which are carried away at the location of the electrolysis tank.

Now, that problem with which the man skilled in the art is confronted is the problem of transporting over a long distance a powder material which is stored in a silo of very large capacity, for feeding such material to processing shops which are disposed at distances of several hundreds of meters from the silo; hitherto the man skilled in the art has solved that problem by using for example mobile containers, high-pressure pneumatic conveyor means or mechanical conveyor means.

More recently, another apparatus for feeding alumina to an electrolysis cell at a plurality of locations thereon was described in U.S. Pat. No. 4,016,053. That apparatus which makes it possible for a powder material to be continuously transported from a storage region to a consumption region comprises firstly a primary fluidized bed conveyor provided with means for supplying and removing the gas used for fluidization purposes and for transporting the powder materials which come from the storage region, with the primary conveyor being kept substantially full of fluidized materials, and then comprises a plurality of conveyors for supplying and removing the gas used for fluidization purposes and for transporting the powder materials coming from the primary conveyor, and maintaining the secondary conveyors continually full of fluidized powder materials, and finally comprises means for the discontinuous feed of powder materials to each electrolysis tank by gravity, each means being fed by way of one of the secondary fluidized-bed conveyors.

Now, and this is a major disadvantage, the apparatus described in U.S. Pat. No. 4,016,053 is required to keep the powder material in a permanent state of fluidization, whether the electrolysis cell has a need to be supplied with powder material or not, and accordingly it consumes substantial amounts of fluidization gas and correspondingly substantial amounts of energy. In addition, and this is another serious disadvantage, in order for the powder materials in the apparatus to remain in a permanent state of fluidization, there is, between the upper face of the fluidized bed and the roof surface of the air-cushion conveyor means, a flow of gas which continuously moves at high speed towards the discharge vents, thereby entraining from the apparatus up to 10% by weight of the flow of powder material in the air-cushion conveyor means.

Thus, the apparatuses described in the prior art cannot fully satisfy the user requirements as they are found to be complicated and burdensome to use under industrial conditions, by virtue of the amounts of energy that they consume, for example in the case of apparatuses involving loading and unloading of material, or pneumatic conveyor systems, or by virtue of the losses of powder materials to which they give rise, or by virtue of using carriages, handling equipment, travelling cranes, movable hoppers, etc.

It is for that reason that the applicants, continuing their research in this area, developed an apparatus for conveying powder materials in a dense bed, which does not suffer from the above-mentioned disadvantages, as they described in patent application Ser. No. 821,205, known as a closed apparatus with potential fluidization for conveying powder materials from a storage region to at least one region to be supplied therewith. That dense-bed apparatus which, between the storage region and the region to be fed with material, comprises at least one horizontal conveyor provided with fluidization means formed by a lower gas flow duct and an upper duct for the flow of the powder material and the gas, between which ducts there is disposed a porous wall, and at least one pipe for the feed of gas to the lower duct, is characterised in that, for the purposes of potential fluidization of the powder material which completely fills the conveyor, and for creating the dense bed, the conveyor is provided with at least one balancing column, the filling height of which balances the pressure of the potential fluidization gas.

In order properly to understand the potential fluidization phenomenon which occurs in accordance with patent application Ser. No. 821,205, it is useful to remember what is involved in fluidization, as usually employed in the prior art for conveying powder materials.

In the case of fluidization as used in the prior art, as may be found for example in above-mentioned U.S. Pat. No. 4,016,053, the fluidization gas is introduced under a given pressure Pf beneath the porous fludization wall which separates the lower duct for the flow of gas and the upper duct for the flow of powder material, of a horizontal conveyor. The fluidization gas passes through the above-mentioned porous wall and then passes between the particles in the rest condition of the powder material forming the layer to be fluidized. The thickness of the layer to be fluidized, in the rest condition, is very much less than the height of the upper duct of the conveyor, that is to say, when no fluidization gas is being injected, the powder material only very partially fills the horizontal conveyor.

As soon as the flow of gas in the interstitial space between the particles is sufficiently high, those particles are mobilized and then lifted, each such particle losing its points of permanent contact with the adjacent particles. In that way, internal friction as between particles is reduced and the particles are put into a state of dynamic suspension. Hence, each particle acted upon by the gas is subjected to a lifting force due to the speed of the gas in contact with that particle, which speed is of the order of the rate of fall of that particle in air.

That accordingly results in an increase in the initial volume of the powder material and correspondingly a reduction in its apparent density since a suspension of a solid phase in a gaseous phase is formed.

In the case of potential fluidization of a dense bed, as carried out in patent application Ser. No. 821,205, the powder material, when no gas is being injected, virtually completely fills the conveying apparatus and in particular the upper duct for the flow of powder material in the horizontal conveyor. The particles in the rest condition of the powder material form a layer of that material to be transported, the thickness of that layer being virtually equal to the height of the upper duct. As soon as the gas is introduced underneath the porous wall which separates the lower gas flow duct from the upper powder material flow duct, such gas being introduced under the same pressure Pf as that which would be used in the prior art to fluidize the powder material, the balancing column is filled with the same material in accordance with a pressure head which balances the pressure Pf and prevents an increase in the interstices between the particles.

Accordingly, the provision of the balancing column prevents fluidization of the powder material in the horizontal conveyor and obliges the material to take up the form of a dense bed with potential fluidization, as the applicants have found in the many experiments they carried out. In addition, as the interstitial distance between the particles does not increase, the permeability of the medium with respect to the gas introduced at the pressure Pf is very low and limits the gas flow to a very low value, by virtue of the section of the balancing column. Thus, and in order to illustrate the phenomenon observed by the present applicants, with the powder material to be transported, which is for example alumina, being subjected to a fluidization pressure Pf of 80 millibars, in the prior art as found for example in U.S. Pat. No. 4,016,053, the gas flow rate corresponding to the pressure Pf, which causes fluidization of the powder material, is of the order of $33 \cdot 10^{-3} m^3 \cdot m^{-2} \cdot s^{-1}$, whereas in the case of the present invention and with the same pressure Pf, the gas flow rate is only of the order of $4 \cdot 10^{-3} m^3 \cdot m^{-2} \cdot s^{-1}$, being a flow rate which is too low to be able to cause fluidization of the alumina in the whole of the conveyor.

The closed potential-fluidization apparatus for conveying powder materials in a dense bed as described in patent application Ser. No. 821,205, being provided with at least one balancing column, provides for transferring the powder material from a storage region to a region in which it is to be consumed.

The consumption region comprises an apparatus for storing the powder material, referred to as the "reserve container", being provided with means for introducing or removing the powder material to be consumed, the reserve container being open to the atmosphere of the consumption region.

However, it may be necessary for the reserve container to be closed in order to protect the powder material present from the atmosphere of the consumption region when that atmosphere may give rise to pollution or may have an attacking action or may give rise to problems in regard to that material or else when that material may cause environmental pollution.

In that case, and in accordance with the invention, the closed storage apparatus or closed reserve container containing the powder material of the consumption region, being provided with means for introducing and removing that material, is characterised in that, in order to establish a balance in respect of pressures between the inside and the outside, the reserve container is provided with at least one opening disposed above the limit level of filling with powder material.

The opening according to the invention may be extended by a pipe which permits the reserve container to be connected to a preferred atmosphere such as for example the ambient atmosphere in the works or a controlled gaseous atmosphere, a system for collecting dust-bearing gas, for degassing, etc.

As described by the applicants in patent application Ser. No. 821,205, the balancing column is preferably vertical. It may be mounted on the axis of the conveyor or it may be positioned laterally and connected to the upper part of the conveyor by any suitable means. The column is generally tubular and the section thereof in a plane perpendicular to its axis may be circular, elliptical or polygonal.

By pursuing their research and carrying out experiments in order to develop the apparatus, as described in patent application Ser. No. 821,205, the applicants found and established that the various technical parameters of the balancing column, as well as the many parameters involved in the powder material to be transported, were associated in relationships which make it possible to define the minimum or total area which the cross section or sections of the columns must have, determined as a proportion of the total area of the porous wall: S. Thus, for a potential-fluidization apparatus for transporting powder material in accordance with the invention, comprising a storage region, at least one closed horizontal conveyor and at least one balancing column for the conveyor, for a fluidization gas pressure Pf and a total area S of the porous wall, the total minimum area $\sigma$ of the cross section of the balancing column or columns must fulfil the following relationship:

$$\sigma \geq S/200$$

Preferably, the total minimum area $\sigma$ is selected to fall within the following limits which were determined experimentally:

$$S/200 \leq \sigma \leq S/20$$

In the particular case of alumina, the applicants found by experiment that the total minimum area $\sigma$ that the cross section of the balancing column or columns must have, must be at least equal to S/100 and preferably between S/100 and S/50. The height of the balancing column must be at least equal to the value extracted from the equilibrium relationship:

$$Pf = H \cdot \rho$$

wherein $\rho$ is the specific weight of the powder material present in the column while Pf is the fluidization gas pressure.

Generally, the potential-fluidization apparatus for conveying material in a dense bed, as described in patent application Ser. No. 821,205 is provided with a single balancing column. However, it may be an attractive proposition to provide it with at least two balancing columns, in particular when the dense-bed conveying installations are very long.

The column in accordance with patent application Ser. No. 821,205 is successfully applied to at least one dense-bed conveyor but it may also form part of an array of dense-bed conveyors, that is to say, conveyors of potential fluidization type, which are disposed in a cascade arrangement, irrespective of the number of stages, the first stage receiving the powder material from the storage region and the last stage feeding the material to the region in which it is to be consumed by way of the open or closed reserve container.

The invention will be better understood by reference to the following non-limiting description of FIG. 1 which illustrates a mode of operation and an industrial use of the apparatus.

The drawing shows a perspective view, with partly cut-away viewing areas, showing a complete dense-bed conveying installation in accordance with the apparatus of this invention.

FIG. 1 shows an installation for feeding alumina to a series of electrolytic cells for the production of aluminium. In an igneous alumina electrolysis cell, the molten bath must be regularly supplied with alumina as it is consumed by a storage region which is disposed above each cell and which feeds the bath from a plurality of locations.

The closed potential-fluidization apparatus according to the invention for the dense-bed conveying of the alumina from a storage region to at least one region for consumption thereof, comprises the means described hereinafter:

An overhead or elevated reservoir 31 for containing alumina, of larger or smaller capacity as required, which is disposed at a spacing from the electrolysis workshop, is positioned at a point on the industrial site which is readily accessible to permit it to be supplied with alumina by a road or rail container or by the apparatus for treating the fluorine-bearing gases which are produced by the electrolysis operation. The reservoir 31 which is generally at atmospheric pressure is connected for gravity feed to a primary conveyor 33, the length of which is equivalent to the length of the part of the electrolysis workshop to be supplied with the material, and which comprises a porous wall 34 of a total area $S_1$, that separates a lower duct 35 for the flow of gas and an upper duct 36 for the flow of the powder material. The lower gas-flow duct 35 is fed by means of the fan 37 and the conduit 38. The upper duct 36 is provided with a balancing column 39, the total minimum area $\sigma 1$ of the section of which must be at least equal to $S_1/100$, thereby creating a dense potential-fluidization bed. The primary conveyor 33 is connected to secondary conveyors 40, also of potential fluidization type, for conveying the material in a dense bed, by means of lateral tappings 41 and inclined conduits 42. The secondary potential-fluidization, dense-bed conveyors 40 are of the same type as the primary potential-fluidization conveyor 33. They are supplied with gas by means of conduits 43 which connect the lower gas flow duct 35 of the primary conveyor 33 to the lower gas flow ducts of the secondary potential-fluidization, dense-bed conveyors 40. Each secondary conveyor 40 extends longitudinally along the top of an electrolysis tank as diagrammatically indicated at 45. Lateral tappings 46 supply alumina to the dipper or plunger tubes 47 which discharge the powder material into closed storage tanks 48 which are disposed above each electrolysis vessel, thus forming a pyramidal volume 50 of powder material. The storage tanks 48 are provided with means 51 for removing the powder material, such means 51 being controlled by the automatic control assembly of the electrolysis cell. Likewise, the end 49 of the tubes 47 may be provided with a closure means which is controlled in dependence on the feed to the electrolysis cell, or it may be closed off by the rise in the level of alumina in the tank 48.

Finally, the wall 53 of the storage tanks 48, which are also referred to as reserve containers, is provided with an opening 52 which makes it possible to establish an equilibrium in respect of the pressures between the inside and the outside of the reserve container, by means of a pipe 57, as referred to hereinbefore.

As stated in patent application Ser. No. 821,205, the movements of gaseous fluids and powder materials in accordance with the invention are remarkable by virtue of the fundamental differences that they exhibit, in comparison with the prior-art processes for conveying powder materials in the form of a fluidized bed.

In accordance with the closed apparatus of potential fluidization type for conveying the material in the form of a dense bed, the powder material, in loose bulk form, occupies the whole of the conveying apparatus, in accordance with the invention, thus expressing the fact that the apparent specific weight of the powder material that fills the apparatus in the regions 31, 32, 36, 39, 41, 42, 40, 46 and 47 is very close to that of the material when it is stored in a heap at atmospheric pressure. The upper level of the powder material in the reservoir 31 must always be above the upper level reached by the powder material in the column 39 when the apparatus is subjected to a gas pressure Pf in 35 and 54. As soon as a gas pressure Pf is applied by means of the conduits 38 and 43 underneath the porous walls 34 and 55, the gas pressure being previously calculated in dependence on the geometry of the installation and being of the same order of magnitude as the gas pressure which would be applied in an air-cushion conveyor apparatus of fluidized bed type, the powder material to be transported occupies the balancing column 39 up to a level 56 in accordance with a pressure head which balances the gas pressure Pf. As the storage container 31 is sufficiently full of the powder material to be transported, the outlet 49 of the discharge means 46 is immersed in the region 50 of the powder material. The resulting equilibrium is maintained as it is as long as the demand for material to be consumed, by the conduit 51, does not cause the outlet 49 to be opened by a drop in the level of the powder material 50.

As the powder material stored in the container 48 is consumed, the level of the heap of material at 50 drops and finishes its downward movement at the level of the outlet 49. As soon as the outlet 49 is exposed, powder material escapes through the discharge means 47 and the outlet 49 by virtue of decompression of the gas contained in the region 46 of the conveyor, which is closest to the consumption region downstream of 51 (not shown). As soon as the consumption region has received the required amount of powder material, the outlet 49 is again closed off, thereby re-creating the equilibrium conditions. The region 46 is then re-supplied with powder material by the material falling in in a stepwise manner, in an upstream direction, back to the silo 31.

The arrangement thus provides for a cascade-type feed of powder material, by a wave or slip effect, which occurs in an upstream direction from the consumption region illustrated by the reserve container 48, to the storage container 31, passing through the means 47, 46, 40, 42, 41, 36 and 32, wherein the powder material is not in any case fluidized in the whole of the apparatus according to the invention.

We claim:

1. In a closed apparatus system of potential-fluidization type for conveying powder materials, comprising a storage region, a supply region, said supply region including a reserve container for receiving powder materials, at least one horizontal conveyor located between said regions, said conveyor being formed by a duct having a lower gas receiving portions, an upper portion for permitting flow of the powder materials and a porous, gas permeable wall disposed between said duct portions, at least one pipe for supplying the lower duct portion with gas to establish a fluidization gas pressure in a conveyor and at least one balancing column having a cross-sectional area which is determined as a proportion of the total area of said porous, gas permeable wall and is filled with said powder material to a height sufficient to counterbalance the fluidization gas pressure, the improvement which comprises at least one lateral opening disposed in said reserve container and positioned above the level for filling said reserve container with powder thereby to establish a pressure equilibrium between the inside and outside of said container.

2. An apparatus system according to claim 1 wherein a conduit is disposed over the opening in said reserve container and communicates between said opening and a preferred atmosphere.

3. An apparatus system according to claim 2 wherein the preferred atmosphere is an ambient atmosphere.

4. An apparatus system according to claim 2 wherein the preferred atmosphere includes a system for collecting dust-bearing gas.

* * * * *